Patented May 13, 1952

2,596,929

UNITED STATES PATENT OFFICE 2,596,929

PLANT GROWTH IMPROVEMENT

John F. Kagy, Long Beach, and Robert R. McPherson, Millbrae, Calif., assignors to The Dow Chemical Company, Midland, Mich., a corporation of Delaware No Drawing. Application January 31, 1948, Serial No. 5,674

4 Claims. (Cl. 71—2.7)

This invention relates to a novel composition of matter and to a method whereby such composition is employed in the treatment of plants. Co-pending application, Serial No. 637,105, filed December 22, 1945 and now United States Patent No. 2,448,265, is concerned with the application of ethylene bromide for the control of soil dwelling invertebrates, and includes the disclosure of emulsion concentrates and liquid dispersions of ethylene bromide and the introduction of these compositions into irrigation water for application to the soil. It is to the water dispersible ethylene bromide compositions and a particular method for their application that the present invention is directed.

Ethylene bromide is a heavy liquid having a specific gravity of 2.17 at 25°/40° C. and but difficultly dispersible in water. As a consequence, it has previously been considered desirable that the compound be applied to soil for fumigation purposes according to special techniques employing complex mechanical applicators and injection devices, and commonly as a solution in an organic solvent. In the treatment of soil prior to planting, such mode of operation has been satisfactory. However, these application techniques and composition forms are not particularly advantageous where it may be desired to treat either established field crops or woody plants such as trees and bushes. Problems attendant such practices include the difficulties inherent in the use of mechanical equipment in closely planted fields and groves, and the injury to plant parts sometimes attributable to local overtreatment in injection operations.

It is an object of the present invention to provide a new and improved ethylene bromide composition. A further object is to provide a soil treating composition in the form of a concentrate containing ethylene bromide which will be readily dispersible with water and adapted to accomplish the rapid solution of ethylene bromide in water. An additional object is the provision of a method for improving the growth characteristics of established plants. Other objects of the invention will become apparent from the following specification.

According to the invention, it has been discovered that ethylene bromide may be compounded with a suitable wetting, dispersing and emulsifying agent to produce an improved concentrate composition. A preferred embodiment of the invention resides in the inclusion of a mutual solvent in the basic composition of ethylene bromide in mixture with wetting, emulsifying, and dispersing agent. It has been found that the concentrates as described are well adapted to be dispersed in water, and the aqueous dispersion applied to the soil adjacent to and preferably into the rhizosphere of established plants to improve the growth characteristics of the plants, and particularly to alleviate and correct conditions of slow decline as found in woody plants.

The advantages accruing to the new water dispersible compositions of the present invention and to operations with these compositions are many. Thus, the new compositions are soluble or otherwise quickly dispersible in water in the proportions required to accomplish the improvement of the growth characteristics of plants when the aqueous solution or dispersion is applied to the soil in which the plants are growing. Through the use of the compositions in irrigation water, improved penetration and distribution of the ethylene bromide to any desired soil depth is accomplished. In such application, it is possible to treat all of the rhizosphere of the tree or plant including both surface and subsoil. The effective agent has the advantage of being uniformly distributed through the moisture phase of the soil and of not being selectively absorbed by soil and soil colloids to a significant degree as are ammonia, inorganic phosphates, and other chemicals commonly employed in soil treating operations. Further, the preferred operation in irrigation water minimizes the possibility of local overtreatment and resultant injury to plant parts and particularly roots such as frequently characterizes the application of soil fumigant materials by mechanical means.

The expression "wetting, dispersing and emulsifying agent" as herein employed refers to one or a combination of complex organic derivatives of the type identified as sulphonic acids, sulphonic acid salts, alkali metal derivatives of abietic acid-containing complexes, polyesters, aromatic acid salts, and ether-esters which have a relatively high solubility in hydrocarbon and halo-hydrocarbon compounds. Illustrative of materials which may be so employed, are alkyl-aryl sulphonic acid, alkali metal rosinates, alkali metal naphthenates, sodium alkyl-aryl sulphonates, sorbitol long-chain fatty acid esters, and polyalkalene derivatives of sorbitol long-chain fatty acid esters. These materials are as described in "Emulsion Technology," 2nd edition, pages 329–346, published 1946, by Chemical Publishing Company, Brooklyn, New York.

The expression "mutual solvent" refers to a product relatively soluble in both ethylene bromide and water, and which, in the completed composition, is compatible with the emulsifying agent. The mutual solvent serves to expedite the formation of oil in water emulsions and to produce more stable emulsions. Representative of this class of materials are methanol, ethanol, normalpropanol, isopropanol, secondarybutanol, ethylene glycol, diethylene glycol, propylene glycol, glycerin, hexalin, and cresylic acid.

"Slow decline" is a condition encountered in plants and particularly established woody plants, and is characterized by loss of vigor. Trees frequently go into slow decline for no apparent reason and the exact cause is not known. Leading authorities hold that slow decline is attributable to a combination of conditions, the majority of which are traceable to the soil. Such conditions and causes may originate in the soil by way of soil organisms or with the tree in the form of viruses, toxic exudates, or toxins attributable to bacteria. The phenomenon of slow decline may develop over a period of years and be evidenced by a reduction in the size of fruit and in total crop, sparse foliage, yellowing of leaves, wilting of leaves during periods of high transpiration, a minimum of new growth, dieback of twigs and eventually large branches, and the death of feeder roots from rot progressing gradually into the larger roots. A detailed description of the outward manifestations of "slow decline" is found in the California Citrograph for September 1946, volume 31, No. 11, page 436 et seq., by G. A. Zentmyer and L. J. Klotz.

The word "rhizosphere" as appearing in the specification and claims refers to the space occupied by the roots of the plant or tree under treatment.

The new concentrates may be prepared in any convenient fashion by mixing together (1) ethylene bromide, (2) the wetting, dispersing and emulsifying agent, and, where desired, (3) the mutual solvent. In practice, good results have been obtained by first dispersing at least 15 percent by weight of the wetting, dispersing and emulsifying agent in the ethylene bromide. Any suitable amount of mutual solvent may then be incorporated in the mixture, the exact proportion being dependent upon the particular solvent selected and the degree of stability and water miscibility desired in the ultimate composition. If desired, other liquid constituents may be incorporated in the concentrate, e. g. petroleum distillates, synthetic halohydrocarbons, benzene, toluene, xylene, and water. The presence of such further additaments in some instances may make necessary the use of increased amounts of mutual solvent and wetting, dispersing and emulsifying agent, if a stable concentrate is desired. In any event, the ultimate composition should contain sufficient wetting, dispersing and emulsifying agent so as to be readily dispersible and to accomplish the rapid solution of ethylene bromide in water, preferably in amount up to the maximum solubility of the ethylene bromide.

To produce aqueous dispersions of the ethylene bromide concentrates, it is sufficient to pour the latter into water with but perfunctory agitation. Thus, the concentrate may be introduced into a mixing box, weir, standpipe or other confining structure through which irrigation water passes, preferably with turbulent flow. Alternately, the concentrate may be metered into a stream of falling water to accomplish quick dispersion. A further means consists of introducing measured amounts of the concentrate into water as it flows through a closed conduit or open ditch, in the latter instance agitating the water during addition of the concentrate to accomplish rapid dispersion. Other modes of operation include adding the concentrate to water in conventional storage, mixing and spray tanks, reservoirs, and the like, the addition being accompanied by a measure of agitation to insure the obtaining of a relatively homogeneous solution.

Dilute aqueous solutions and dispersions of ethylene bromide as obtained above may be employed wherever it is desired to control soil organisms, but more particularly for improving the growth characteristics of established plants and correcting the conditions contributing to slow decline of established woody plants. The exact mechanism of the action of the aqueous ethylene bromide upon soil and in improving plant growth characteristics is not understood. However, it has been established that the control of soil-dwelling invertebrates such as nematodes and wire worms is not the complete explanation. Trees and other plants growing in soil substantially free of nematode and wire worm infestation, appear to be materially stimulated by treatment with aqueous ethylene bromide. Similarly, many field crops subjected to irrigation with dilute solutions of ethylene bromide in water show significantly improved growth in comparison to controls growing on soils previously disinfected by other means.

The exact mode of application of the aqueous solutions of ethylene bromide is not critical. Thus, the solutions may be sprayed upon the surface of the ground through permanent sprinkling systems or by drawn spray rigs. They may be applied through existing irrigation facilities, whether open ditch or closed system. If desired, the soil may be arranged to form a basin around the base of an affected tree or bush, or parallel and adjacent to the rows of a field crop, and spot treatment employed. Ornamentals in tubs and pots may be watered with the solution. Any practical method may be employed provided only that penetration be accomplished to the roots of the plant and the soil in contact therewith.

Any operable concentration of effective agent may be employed in water up to about 0.43 percent by weight, the solubility of ethylene bromide in water at 25° C. However, the dosage of ethylene bromide applied to a given volume of soil is critical. It has been determined that at least about 1.125 pounds of ethylene bromide per 100 cubic yards of soil is required to obtain optimum results. Woody plants will tolerate up to about 6.75 pounds per 100 cubic yards of soil, depending upon the species concerned. Established field crops vary greatly in their tolerance, but for the most part a top limit of 18.0 pounds of ethylene bromide per 100 cubic yards of soil is preferred. Exceptions to the foregoing are some plants which are extremely sensitive to even small amounts of ethylene bromide, and others which are not damageed at dosages 8 to 10 times those indicated. Where treatment is being carried out on soil which has not been planted and is to fallowed for a considerable period, any operable proportion of ethylene bromide may be employed.

The following examples illustrate the invention but are not to be construed as limiting.

Example 1

Eureka lemon trees, two years old from cuttings, were subjected to irrigation with water containing varying amounts of dissolved ethylene bromide. In this operation, an emulsion concentrate was employed consisting of 50 parts by weight of ethylene bromide, 10 parts of sodium alkylaryl sulphonate, and 40 parts of methyl alcohol.

The treatments were made with from 1 to 8 gallons of ethylene bromide per acre dispersed in sufficient water to moisten the soil from the surface to the extremities of the rhizosphere of the trees, a depth of approximately 1 foot. During the following 5 months, the lemon trees were subjected to conventional irrigation, cultivation, and pest control practices. At the end of this time, the trees originally treated with ethylene bromide in the amount of from 1 to 4 gallons per acre (1.125 and 4.5 pounds of ethylene bromide, respectively, per 100 cubic yards of soil) had foliage appearing to contain a significantly higher chlorophyl content than the foliage of the controls. On analysis, it was found that the nitrogen content from the leaves of these trees was from 5 to 15 percent higher than in leaves from the control trees. Leaf retention by the treated trees was superior with a minimum of yellowing and with larger leaves on the new growth than was the case with the control trees. The treatments with 6 gallons per acre (a dosage of 6.75 pounds of ethylene bromide per 100 cubic yards of soil) appeared to be marginal and 8 gallons per acre was a definite overdosage.

Example 2

49.67 parts by weight of ethylene bromide, 22.6 parts of potassium rosinate, 12.7 parts of petroleum oil, 4.0 parts of sodium naphthenate, 6.8 parts of sodium alkylaryl sulphonate, and 4.23 parts of propylene glycol were compounded together to produce an emulsion concentrate readily dispersible in water in amounts up to and including those giving a saturated solution of ethylene bromide. The concentrate was employed for the treatment of a grove of Valenica orange trees from 20 to 30 years in age and exhibiting the effects of "slow decline" to such an extent as to render their continued maintenance unprofitable. In this operation, the earth in and about the trunk of each tree was manipulated to form a basin roughly co-extensive with the rhizosphere of the tree. The ethylene bromide emulsion concentrate, in the proportion of 2 gallons per acre, was dispersed in irrigation water and the water conducted into the basins around the trees. Two-acre inches of the modified irrigation water was employed which wet the soil to a depth of about 2 feet (a dosage of 1.125 pounds of ethylene bromide per 100 cubic yards of soil). Four such applications were made over a period of three months. One month after the fourth application, the treated trees were inspected and compared with a group of adjacent control trees growing under substantially identical soil conditions and which had received four irrigations with plain water.

At the beginning of the treatment, all of the trees were characterized by stunted and yellowing leaves and a large proportion of dead branches. At the time of inspection, the treated trees showed a considerable flush of new growth, large leaves and good color. Adjoining rows of control trees exhibited significantly less new growth and smaller leaves.

Example 3

Sixty parts by weight of ethylene bromide is dispersed in 30 parts of partially neutralized sulphonated sperm oil, 10 parts of cyclohexenone is added, and the mixture vigorously agitated to produce an ethylene bromide concentrate. This product is employed in irrigation water for the treatment of portions of a grove of 15-year old Fuerte avocado trees on fine sandy loam. This grove showed "slow decline" as evidenced by the yellowing of leaves, defoliation, wilting, die-back of terminal twigs and branches, and little or no new growth.

In the treatment, the irrigation water is applied by sprinkling the surface of the soil at the rate of 3.5 acre-inches (a penetration of approximately 3 feet). The ethylene bromide concentrate is dispersed in the water in such amount as to deposit 4.0 gallons of toxicant per acre which amounts to a dosage of 1.5 pounds of ethylene bromide per 100 cubic yards of soil. Control trees are subjected to conventional treatment with irrigation water at the rate of 3.5 acre-inches but in the absence of ethylene bromide. Nine months to one year after treatment, the treated trees show significant reduction in the amount of die-back, defoliation, and yellowing of leaves, with increased yield of fruit, all in comparison with the control trees. A further significant improvement is in the increase of new growth on trees subjected to the ethylene bromide treatment.

Example 4

Two gallons of ethylene bromide, 0.87 gallons of sorbitan tri-oleate polyoxyalkylene derivative and 26.12 gallons of a petroleum hydrocarbon oil boiling at 71°–124° C., were mixed together to produce a water dispersible composition. This product was introduced into and agitated with sufficient water to penetrate to a depth of approximately 2 feet over a soil plot 110 by 112 feet in area. The aqueous composition was used in the irrigation of the indicated plot (calculated at approximately 3 acre-inches of water). This treatment provided a dosage of 4.0 pounds of ethylene bromide per 100 cubic yards of soil.

In operation, the application was accomplished by feeding the concentrate with mild agitation into the effluent water from an irrigation standpipe during a conventional irrigation operation. The treated area and a check plot were planted five months later with lima beans. The beans planted in the treated plot had high germination and emergence and showed less than 6 percent injury from soil-borne organisms. During the growing season, the stand developed well with unusually green and luxuriant foliage, and gave a high yield on harvest.

Beans planted in the check plot showed poor emergence and developed slowly with over 50 percent of the meager and spotty stand dwarfed and twisted in appearance. At maturity, the apparent yield was so small that the crop was not harvested.

Example 5

Sugar beets were planted on soil badly contaminated with invertebrate organisms and upon which a succession of field crops had failed. Seven months after planting, the beets were relatively mature but were so stunted and of such an unequal distribution and spotty stand that the crop appeared to be a total loss.

The ethylene bromide concentrate as described in Example 2 was dispersed in the water during a conventional irrigation operation (to a depth of 2 feet) in amount sufficient to deposit ethylene bromide over the field at the rate of 3 gallons per acre which amounts to a dosage of 1.7 pounds of ethylene bromide per 100 cubic yards of soil. The treated beets immediately began to exhibit signs of further growth and within the next several weeks became green, healthy and vigorous plants. The plants, in that portion of the field which was not subjected to treatment with the ethylene bromide, appeared to be dying wih progressive yellowing of their leaves.

Three months later, both treated and check plots were harvested. Fourteen tons of marketable beets per acre were obtained from the treated plots. The yield from the check plot was only 10 tons per acre and even this yield was largely attributable to the presence of small stands on the extremities of the field which did not share the disabilities of the overall planting.

*Example 6*

The composition described in Example 2 was employed for the treatment of a number of established field crops to determine their tolerance for aqueous ethylene bromide. In these applications, the concentrate was dispersed in irrigation water and the latter applied in such amount as to wet the soil to a depth of approximately 6 inches. It was found that stands of 6-week old lima beans and carrots were not injured at applications of 5 gallons of ethylene bromide per acre (11.2 pounds per 100 cubic yards of soil) and appeared to tolerate as much as 8 gallons per acre (18.0 pounds per 100 cubic yards of soil). Six-week old stands of peas and corn survived treatment with ethylene bromide in the amount of 5 gallons per acre (a dosage of 11.2 pounds of ethylene bromide per 100 cubic yards of soil), but this appeared to be the maximum amount tolerated by the plants. Three-week old tomato plants were killed when the ethylene bromide was employed at 5 gallons per acre (11.2 pounds dosage as above). Somewhat more mature tomato plants tolerated 4 gallons of ethylene bromide per acre (a dosage of 9 pounds of ethylene bromide per 100 cubic yards of soil) with no indication of injury. Lettuce appeared to be very susceptible to injury from ethylene bromide applied in irrigation water. A vigorous stand of rape was not visibly injured by the application of 40 gallons of ethylene bromide per acre in the irrigation water (a dosage of 90 pounds of ethylene bromide per 100 cubic yards of soil). The maximum proportion tolerated by established citrus seedlings appeared to be approximately 6 gallons per acre of ethylene bromide distributed through the top foot of soil, as shown in Example 1. This amounts to a dosage of 6.75 pounds of ethylene bromide per 100 cubic yards of soil.

*Example 7*

A 10 per cent by volume solution of ethylene bromide in petroleum oil boiling at 71°–124° C. was applied at the rate of 50 gallons per acre in 6-inch deep furrows for the control of white grubs. The furrows were covered and packed immediately after application of the fumigant. Later inspections of the treated soil and of citrus seedlings growing adjacent thereto indicated a commercial control of the grubs without significant injury to the seedlings.

Other field crops and woody plants which may be treated as described above to influence improved growth characteristics and yields include sweet potato, Irish potato, squash, strawberry, cabbage, cauliflower, broccoli, Brussels sprouts, radish, navel orange, grapefruit, Kadota fig, English walnut, prune, almond, spirea, and grapes. If desired, fertilizing materials such as nitrates, phosphates, and ammonia may be incorporated in the aqueous treating solutions.

We claim:

1. A method for improving the growth characteristics of established woody plants which comprises the step of introducing into soil of the rhizosphere of the woody plant a solution of ethylene bromide in water, the ethylene bromide being supplied in an amount equal to from 1.125 to 6.75 pounds per 100 cubic yards of soil wetted by the solution.

2. A method for improving the growth characteristics of established plants which comprises the step of introducing into soil of the rhizosphere of the plant a solution of ethylene bromide in water, the ethylene bromide being supplied in an amount equal to from 1.125 to 18.0 pounds per 100 cubic yards of coil wetted by the solution.

3. A method for improving the growth characteristics of established plants which comprises the steps of (1) dissolving ethylene bromide in water, and (2) introducing the resulting aqueous solution into soil of the rhizosphere of the plant in such amount as to provide a dosage of from 1.125 to 18.0 pounds of ethylene bromide per 100 cubic yards of soil wetted by the solution.

4. A method for improving the growth characteristics of established plants which comprises the steps of (1) introducing a water-dispersible ethylene bromide concentrate into irrigation water, and (2) flowing the resulting aqueous product adjacent to the plant so as relatively uniformly to distribute the ethylene bromide through soil of the rhizosphere of the plant in the dosage of from 1.125 to 18.0 pounds of ethylene bromide per 100 cubic yards of soil wetted by the solution.

JOHN F. KAGY.
ROBERT R. McPHERSON.

REFERENCES CITED

The following references are of record in the file of this patent:

UNITED STATES PATENTS

| Number | Name | Date |
|---|---|---|
| 1,862,238 | Roe | June 7, 1932 |
| 2,213,260 | Rinke | Sept. 3, 1940 |
| 2,336,270 | Lynn et al. | Dec. 7, 1943 |
| 2,380,416 | Davidson | July 31, 1945 |
| 2,435,204 | Davidson | Feb. 3, 1948 |

OTHER REFERENCES

J. Economic Entomology, vol. 38, No. 6 (Dec. 1945), pages 717 and 718.